United States Patent [19]

Murch et al.

[11] Patent Number: 4,618,760
[45] Date of Patent: Oct. 21, 1986

[54] SHIELDED ARC WELDING USING AUXILIARY VOLTAGE

[75] Inventors: Michael G. Murch, Royston; Geoffrey B. Melton, Gt Abington, both of England

[73] Assignee: The Welding Institute, Cambridge, England

[21] Appl. No.: 689,712

[22] Filed: Jan. 8, 1985

[30] Foreign Application Priority Data

Jan. 11, 1984 [GB] United Kingdom ............... 8400685

[51] Int. Cl.⁴ ............................................. B23K 9/06
[52] U.S. Cl. ............................ 219/130.4; 219/137 PS
[58] Field of Search ............... 219/130.4, 130.51, 136, 219/137 PS

[56] References Cited

U.S. PATENT DOCUMENTS

| | | | |
|---|---|---|---|
| 3,260,890 | 7/1966 | Normando et al. | 219/130.4 |
| 3,538,376 | 11/1970 | Parker . | |
| 3,571,558 | 3/1971 | Hogan, Jr. | 219/130.4 |
| 4,046,987 | 9/1977 | Hashimoto . | |
| 4,061,899 | 12/1977 | Gillitzer . | |
| 4,301,355 | 11/1981 | Kimbrough . | |
| 4,338,512 | 6/1983 | Salzer . | |
| 4,418,265 | 11/1983 | Tabata et al. | 219/130.4 |

*Primary Examiner*—Clifford C. Shaw
*Attorney, Agent, or Firm*—Martin Novack

[57] ABSTRACT

Shielded arc welding apparatus advances a consumable electrode towards a workpiece; applies a welding voltage between the electrode and the workpiece; and applies an auxiliary voltage between the electrode and the workpiece, whereby the auxiliary voltage initiates an arc between the electrode and the workpiece before the electrode engages the workpiece.

15 Claims, 6 Drawing Figures

SHIELDED ARC WELDING USING AUXILIARY VOLTAGE

This invention relates to a method and apparatus for shielded arc welding using a consumable electrode, such as MIG/MAG, which are generally operated in a protective atmosphere including inert or substantially inert gas shields.

Welding arcs are normally initiated by short circuiting the electrode to the work and withdrawing to strike the arc, such as in MMA welding. The retraction is less easy to carry out in the MIG/MAG welding processes where high wire feed speeds are used, since the withdrawal of the welding head must overtake the feed. Frequently, to avoid this problem particularly with low resistance electrode wires such as aluminum and its alloys, the feed is activated after the arc has been drawn so that initially the electrode projecting from the welding gun is stationary. Alternatively a lower-than-normal forward feed (creep feed) is used. In either instance the wire feed must be rapidly accelerated to the normal working value as soon as the arc is established, particularly where the current from the power supply is in excess following this prior short-circuit, to avoid burning back the wire and possibly damaging the current contact tip in the welding gun.

This short circuit ignition technique is commonly practiced in manual welding, but is less practicable in mechanised welding since the rapid retraction of the welding gun is inconvenient and involves additional mechanical arrangements. This is particularly found to be a disadvantage in robot welding where ideally the arc should be initiated with the welding gun in its correct position, without necessitating additional movements which involve further programming of the robot controls. Moreover the inertia of the head and arm linkages involved make rapid retraction (to offset the wire feed) over a short distance difficult if not impossible. Therefore in mechanised and robot welding, especially with resistive electrode wires such as mild steel, it is common practice to creep feed the wire until it touches the work and to draw a sufficiently high short circuit current from the welding power supply to fuse the wire in spite of the forward motion still present. This necessitates high short circuit currents and generally results in a violent disruption of the wire extension (from the welding gun to the work) which causes severe spatter. This is not only potentially deleterious to the weld, but also reduces the operating life of the welding gun due to the accumulation of relatively large drops of spatter which adhere to the shielding gas nozzle and in turn lead to deterioration in the efficacy of the gas shield.

In accordance with one aspect of the present invention, A method of shielded arc welding using a consumable wire electrode comprises applying a welding voltage between the electrode and a workpiece; applying an auxiliary voltage between the electrode and the workpiece; and advancing the electrode towards the workpiece, the auxiliary voltage being such that the arc is initiated before the electrode engages the workpiece.

The invention provides substantially contactless ignition of the consumable electrode arc, so as to avoid the heavy initial short circuit (and its associated disruption of the electrode extension causing severe spatter) without necessitating withdrawing the welding gun or introducing reverse motion in the wire feed. Also, the currents employed are much lower than in known short circuit methods.

Furthermore the present invention provides a system for initiating a consumable electrode arc, such as a MIG/MAG welding arc, at a relatively low power source open circuit voltage, such as less than 50 V, while avoiding substantial or heavy short circuit currents which cause major disruption to the electrode wire (such as fusing the wire extension from the contact in the welding gun to the work).

The electrode wire may be self-shielded or alternatively gas shielded in known manner.

The invention is particularly applicable to the initiating of the MIG/MAG arc in mechanised, and particularly in robotic, welding where a large number of starts may be required in executing a complete weldment, including initial tacks or arc spot welds. In such systems the initial gap between the electrode tip and the work is not preset, as it is the resultant of the previous arcing operation whereby, in shutting down the current and arresting the feed, the wire extension is burnt back to a varying degree. Therefore in initiating the subsequent arc the initial gap can vary over several millimeters. Moreover the wire tip, unlike the tungsten electrode in TIG welding, is not ground to a point but generally has a balled end of up to twice the wire diameter in size (which again is a resultant of the previous arcing operation).

Normally, the electrode is advanced towards the workpiece at the same time as the auxiliary voltage is applied. However, in some cases it may be preferable to delay the electrode feed for a finite period, such as 0.03 seconds, to allow enough voltage build up to occur so that the minimum sparking potential is exceeded. Although the electrode may be advanced at the same rate as is used in subsequent arc welding, it is generally preferable to initiate the feed at a lower speed. Very low creep feeds as are commonly practised for short circuit starting are not necessary, and generally the preferred feed rate lies in the range of 20–100 mm/sec which may be compared with typical feed speeds during welding 50–200 mm/sec for MIG/MAG operation.

Although the auxiliary voltage may be fixed, it is preferable for the voltage to generally increase, and it is particularly convenient if this general increase starts from substantially zero potential for maximum safety. Alternatively the auxiliary voltage may be arranged to have a suitable finite minimum valve, such as 200 V, from which it builds up in conjunction with the advancement of the electrode wire towards the workpiece.

Where the auxiliary voltage increases, it is preferable if the principal rate of increase lies in the range of 1 kV in 0.1 seconds to 1 kV in 0.01 seconds.

Conveniently, the auxiliary voltage increases substantially exponentially towards a maximum value which is preferably less than 2 kV. Additionally the maximum voltage may be limited to a finite value such as 1 kV in a charging circuit with an EMF of say 2 kV. In particular the auxiliary voltage may lie in the range 400–1000 V, preferably 600–750 V.

To avoid electrical interference, it is preferable if the auxiliary voltage is not a high frequency spark discharge but corresponds to a very low frequency surge of less than 10 Hz.

In accordance with a second aspect of the present invention, shielded arc welding apparatus comprises means for advancing a consumable electrode towards a workpiece; means for applying a welding voltage between the electrode and the workpiece; and means for applying an auxiliary voltage between the electrode and the workpiece, the auxiliary voltage being such that the arc is initiated in use before the electrode engages the workpiece.

The method and apparatus can be used for so called self-shielded wires operated in air or $CO_2$ and moreover in principle can be adapted to flux shielded processes such as submerged arc and electroslag welding. For convenience the method and apparatus are described with respect to MIG/MAG welding and its initiation.

A MIG welding method and apparatus in accordance with the present invention will now be described with reference to the accompanying drawings, in which.

Figure 1:
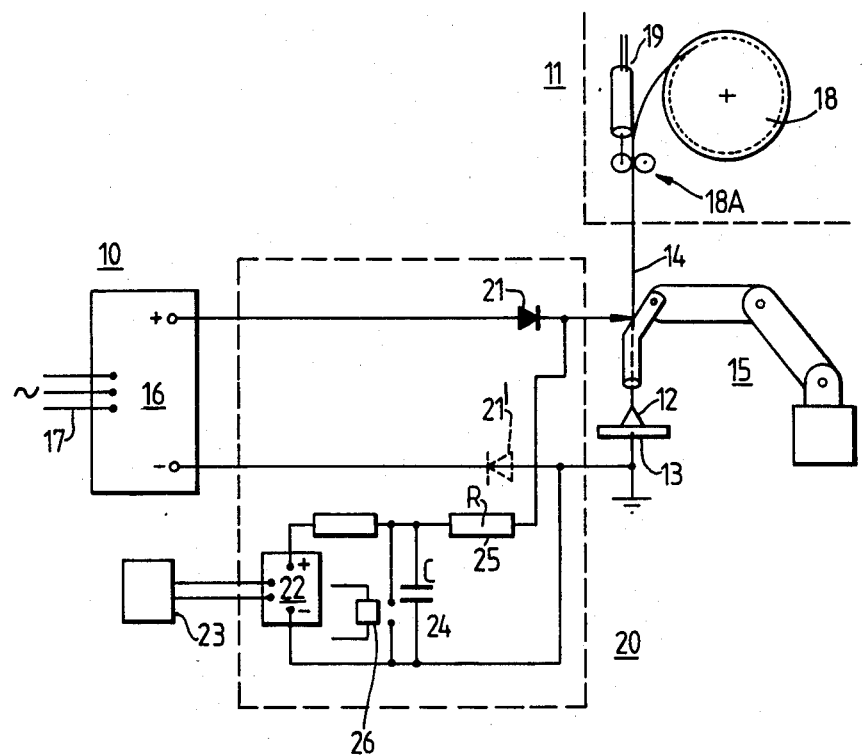
FIG. 1 shows a simple welding circuit including a medium voltage arc initiation supply in parallel connection.

FIG. 1 shows schematically a basic MIG or MAG welding power circuit 10, together with an electrode wire feeding system 11, for operating an arc 12, which is between a workpiece 13 and a wire electrode 14, which is manipulated in a mechanised system with respect to the workpiece by any suitable means such as a computer controlled robot arm 15. Welding current is drawn from a power supply 16, which in turn is connected to a mains power supply 17, via isolating means not shown. The consumable electrode wire 14 such as mild steel, is drawn from a store or reel 18, by means of a wire feeder system 18A which is connected to an electrical supply 19 with control means not shown.

Figure 4:
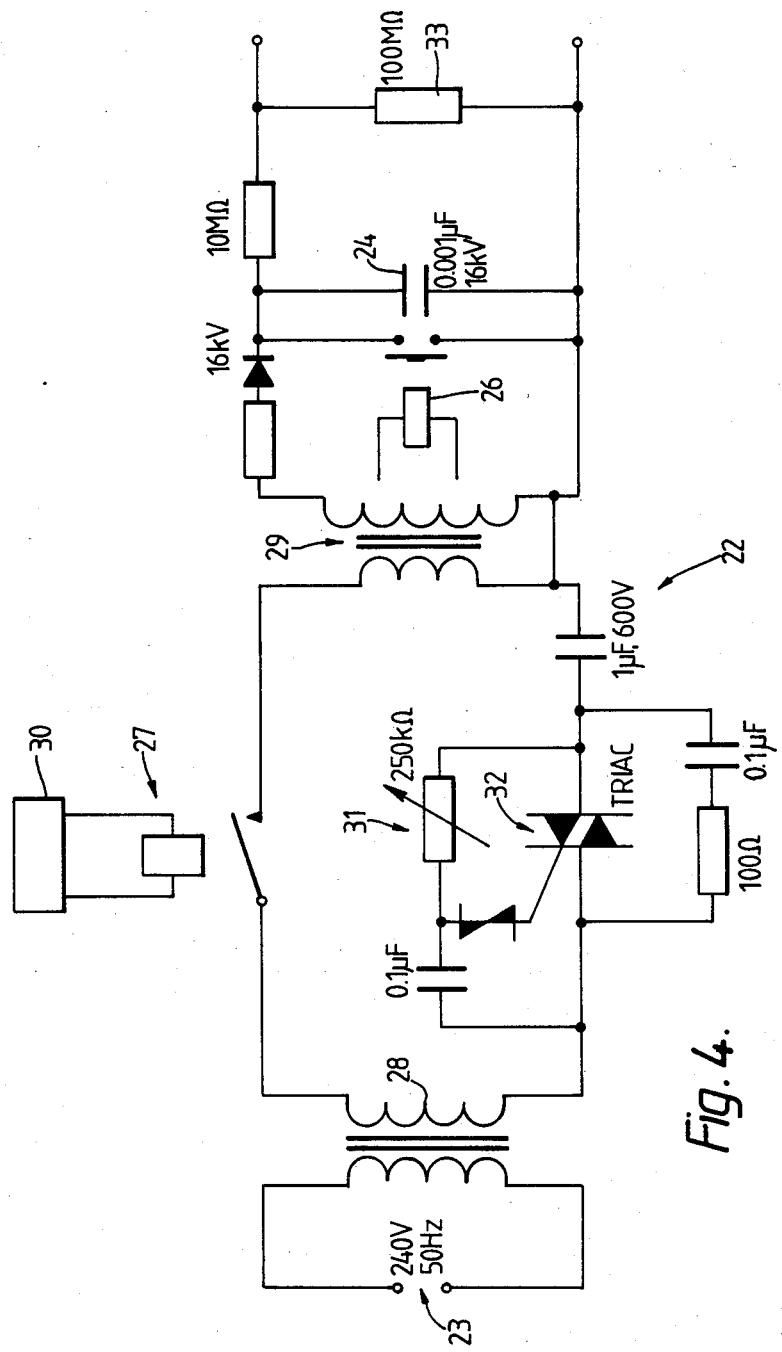
FIG. 4 illustrates a suitable medium voltage circuit for arc initiation.

An auxiliary voltage supply system 20 for initiating the MIG/MAG arc 12 comprises a high current high voltage isolating diode 21, together with a medium voltage charging supply 22 (which in turn is connected to an electrical supply 23) in conjunction with a medium voltage capacitor 24 and an output resistor 25. The medium voltage supply can be shorted out or the capacitor 24 discharged via relay contacts 26 connected to a microcomputer 30 (FIG. 4). To ensure additional safety from shock hazard the relay contacts 26, may remain closed except for a brief period when the welding arc 12 is about to be initiated. Thus all operations involving the mechanised system 15, and the wire feeder 11, with respect to the welding system 10, can be carried out with the medium voltage supply 22 shorted out and also disconnected from its electrical supply 23, by means not shown. Typically, the medium voltage lies between 300 and 3000 V.

Figure 2:
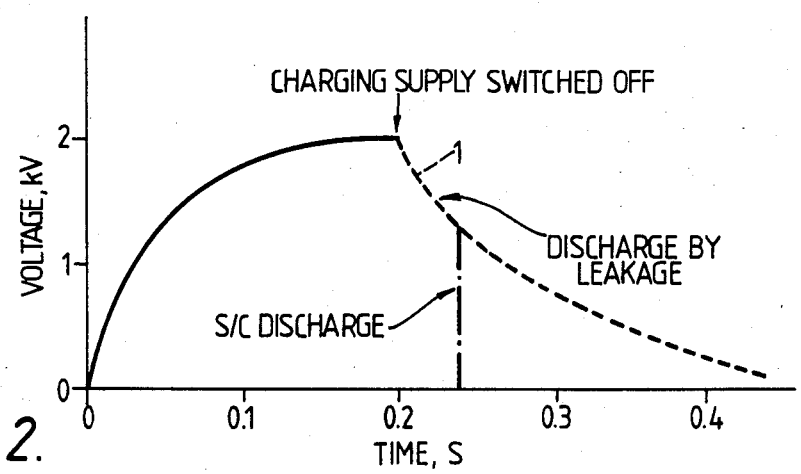
FIG. 2 shows the build up of the medium potential against time.

To initiate an arc between the consumable electrode 14 and the workpiece 13, the medium voltage supply is applied to the electrode 14 while it is being fed towards the workpiece 13. Although a fixed medium voltage can be used for initiating the arc, it is preferable as indicated below for the initiation voltage to build up towards a final level. It is also convenient for the build up to start from substantially zero potential, as indicated in FIG. 2, following the opening of the relay contacts 26 (or from a finite low level), and to apply a charging potential to the capacitor 24, from the relatively high impedance medium voltage supply 22. The initial rate of build up is not critical and, depending on the wire feed characteristics, can range from as low as 1 kV in 0.1 seconds to as high as 1 kV in 0.01 seconds. For thicker wires as in submerged arc or electroslag welding, as the feed speeds are low the build up rate may be even lower, such as 1 kV in 0.5 seconds. This build up characteristic from zero or from a low finite potential also increases the safety aspects of the system. Equally the maximum value of the medium voltage is kept as low as practicable and in general is less than 2 kV. Moreover the maximum voltage may be further limited such as to 1 kV in a charging circuit with an emf of say 2 kV. For additional safety the supply to the medium voltage circuit from the electrical supply 23 is cut off after a finite period such as 0.2 seconds or such greater period as is deemed necessary for submerged arc on electroslag welding where the wire feed rate is low compared with MIG/MAG welding, following which the voltage collapses by leakage (line 1 in FIG. 2) even if the relay contacts 26 are not closed subsequently. (This avoids the continuing existence of potentials in excess of 100 V in the welding system in the event of the electrode wire failing to be fed forward to initiate the arc). Also to avoid electrical interference the medium voltage applied to the welding circuit is not a high frequency spark discharge but corresponds to a very low frequency surge of less than 10 Hz.

For initiating the arc this medium voltage is maintained for a sufficient period to allow the electrode 14 to approach the workpiece 13 closely, independently of the initial gap between the electrode tip and workpiece. Moreover to avoid the electrode short circuiting onto the work, the medium voltage supply should preferably exceed the minimum sparking potential in the shielding gas or atmosphere or flux concerned at least once electrode feed has commenced. The minimum sparking potential between spherical electrodes for the inert gases argon and helium and their mixtures is approximately 200 V. Preferably the medium voltage supply for arc initiation exceeds twice the minimum sparking potential, so that breakdown occurs while there is still a discernable gap between the electrode 14 and the workpiece 13.

Figure 3:
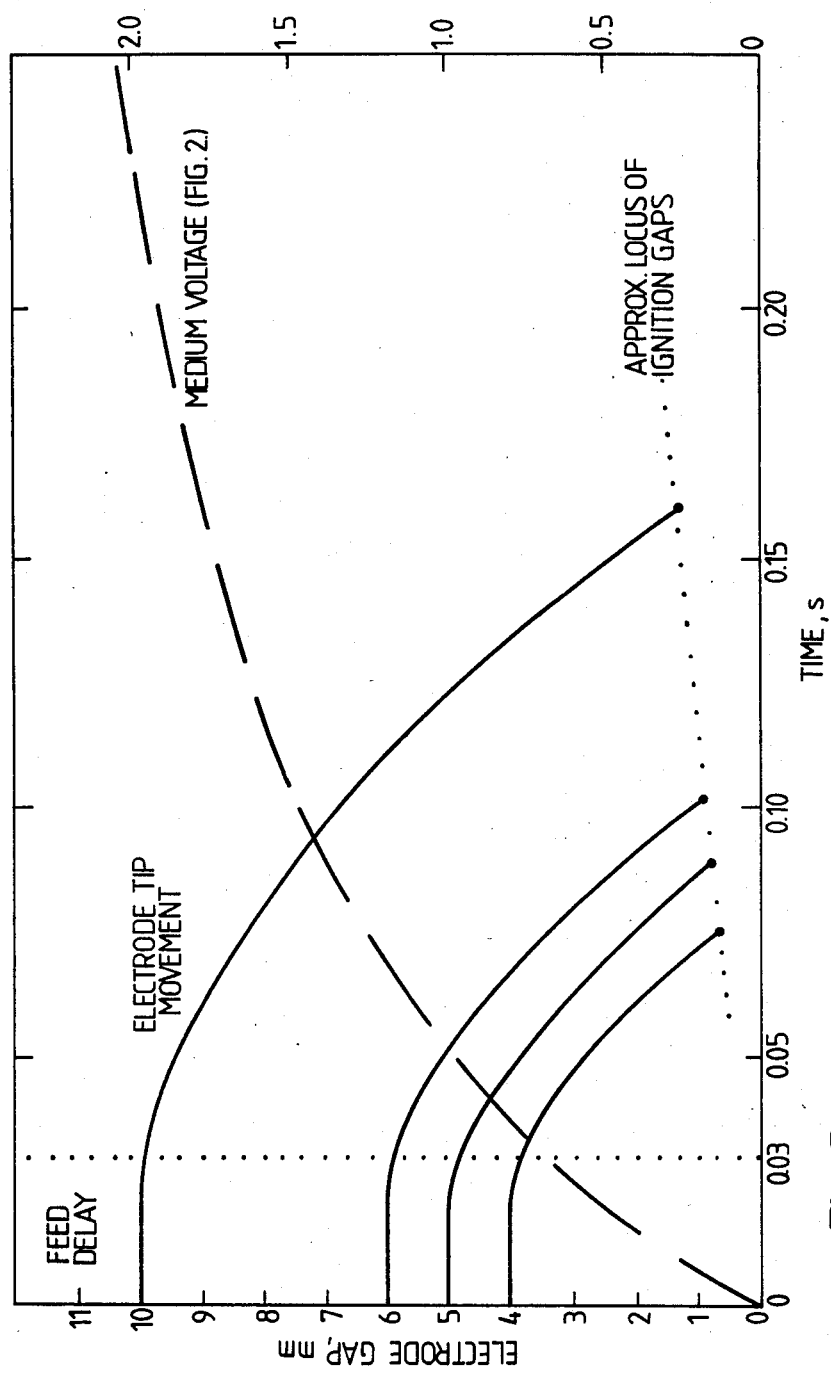
FIG. 3 illustrates the feed of the electrode wire in combination with the medium voltage build up.

In normal use the electrode wire 14 feeds foward until the remaining gap between it and the workpiece 13 is sufficiently small such that it sparks-over under the rising applied medium voltage. As illustrated in FIG. 3 the electrode feed may be delayed for a finite period such as 0.03 seconds, to allow enough voltage build up from zero so that the minimum sparking potential is exceeded. Alternatively, the auxiliary voltage may be arranged to have a finite minimum value, such as 200 V, from which it builds up. This ensures suitable ignition of the arc even if the initial gap is very small, such as less than 1 mm. Normally however the initial gap is in the range of 5–10 mm and steadily decreases due to the electrode feed as indicated. As the electrode tip (which is generally in the form of a solidified ball) approaches the work, the arc is initiated at a relatively short distance by virtue of the medium voltage supply.

It should be noted that in practice the wire feed is accelerating towards the set levels, such that the instantaneous feed rate after moving a short distance is lower than that after moving over a greater initial gap. Therefore it is preferable to initiate the arc at a slightly greater gap when the instantaneous feed is relatively greater (compared with that when the initial gap is small and the feed is comparatively low). This is readily accomplished by means of the build up characteristic of the medium voltage supply where, if the initial gap is small (feed rate less) the voltage available is appreciably less than later in the build up characteristic. Conversely for a large initial gap where there is a significant time period during which the wire feed accelerates to its working level, the medium voltage approaches the maximum available and the arc is initiated at a greater gap. This compensates for the natural reduction in the initial burning back of the wire tip by the arc once it is formed.

The welding power source 16 is protected from the medium voltage initiation supply by the series isolating diode 21. This is rated for the full inverse voltage of the initiation supply and for the full working current of the welding arc. If desired another series diode 21' can be inserted in the welding current return lead also. A suitable diode is Westinghouse D508 which is rated at 4.4 kV inverse and 500A. For yet higher currents two such diodes may be operated in parallel, or alternatively the diode shorted out by a small contactor soon after the arc has been established. The leakage associated with the reverse current characteristics of the diode and any shunt paths between the electrode 14 and the workpiece 13 such as introduced by a water cooled welding torch, should in combination be equivalent to at least twice the resistance of the resistor 25 and preferably equivalent to more than five times this resistance value.

The power source current should exceed the value required to burn back the wire at the rate at which it is being initially fed by say at least 50 percent. This ensures that the wire tip is burnt back and a major short circuit avoided, even if the gap at which the arc is initiated is less than 1 mm. It may also be beneficial to operate the arc at a higher power for a finite period such as 0.5 to 1 second, before returning to the equilibrium value for the remainder of the arcing period. This excess power stage aids the initial fusing or wetting in of the newly deposited electrode wire on to the workpiece. If the build up to the required current is not sufficiently rapid or if the initial gap is very short, less than 0.5 mm, it is possible for the wire to short onto the workpiece 13 following arc initiation. This however does not lead to a disruptive short circuit since the tip is already being melted by the arc and only a short duration short circuit occurs. In this connection it is noted that a square ended tip to the electrode wire can be fused to a distance back along the wire equivalent to one-third the wire diameter. This volume of material then represents a hemisphere on the wire of radius equal to half the wire diameter. Thus to reduce the chance of even a brief short circuit, the gap at which the arc is initiated should be preferably in the range of half to one wire diameter.

It should be noted that without the initial arc being struck at a finite gap the wire 14 will contact the workpiece 13 without any prior melting and a full short circuit will occur. In general the wire then fuses along a major portion of the wire extension between the contact tip and the workpiece, since it is cooled by the relatively larger thermal masses at these latter two points. Thus fusing of the wire takes place along its mid-length region and a major portion of the wire is lost in spatter. On the other hand with the minor short circuit which can occur following arc initiation at a very small finite gap, only the wire tip is fused and gross spatter is avoided. Normally arc initiation is achieved at a small but finite gap with no subsequent brief short circuit and the spatter associated with arc starting is very substantially reduced, if not eliminated altogether. After initiation, the wire feed speed is further accelerated to the working value if not already at the operating level and the current brought to an appropriate set level (with a so called drooping characteristic or constant current power supply) or allowed to find the equilibrium to provide the equal and opposite burnoff rate in accordance with the well known self-adjusting characteristics associated with a relatively flat characteristic or constant potential power supply.

The system described is particularly convenient for initiating so-called open arc consumable electrode arcs, which operate without substantial short circuiting. The system described can however also be applied to initiating the short circuiting type of MIG/MAG arc wherein the electrode 14 during welding makes frequent contact with the workpiece 13 such that the molten tip is transferred into the weldpool during each short circuit. In the intervening brief arcing periods the wire tip is again melted in preparation for the ensuing short circuit and this cycle of events is repeated as a quasi-equilibrium with a relatively low operating voltage at the welding arc.

The initiation system can be attached to any suitable welding power supply and connected near the power supply terminals or preferably, as indicated in FIG. 1, near to the operating arc head. An example of a suitable medium voltage initiation circuit is shown in FIG. 4, which includes isolating means 27, such as a pulse relay, for disconnecting the medium voltage charging unit 22 from the line supply 23.

The line supply 23 comprises a 240 V, 50 Hz AC source connected to an isolating transformer 28 of the unit 22. The AC is supplied to a medium voltage transformer 29 when the pulse relay 27 is closed. A phase shift control 31 controls a Triac 32 which controls the maximum voltage applied to the transformer 29. FIG. 4 illustrates a leakage resistor 33 not shown in FIG. 1. The pulse relay may be controlled from the microcomputer 30 of the welding apparatus.

Figure 5:
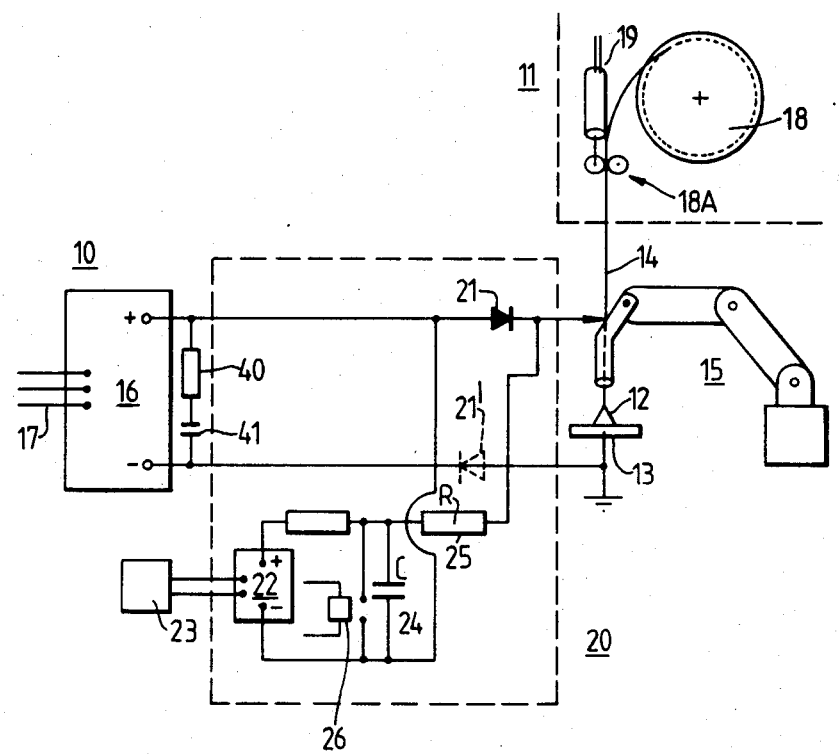
FIG. 5 shows a simple welding circuit including a medium voltage arc initiation supply in series connection.

FIG. 5 shows an alternative connection of the auxiliary voltage in series with the welding power supply 16. The auxiliary voltage circuit is connected such that its low potential connection is between the diode 21 and the welding power supply 16, while its high potential connection is between the diode 21 and the wire 14. This arrangement has the advantage that the auxiliary voltage supply is connected entirely in the welding lead to the torch. It may also be beneficial to add a supplementary capacitor and resistor 41, 40, across the welding power supply 16 particularly for so called self-shielding electrode wires. Typical values for the capacitor 41 are in the range 10 to 1000 $\mu$F, and for the resistor 40 3 to 0.3$\Omega$. This aids the formation of the arc and provides the initial first current (following the breakdown from the auxiliary voltage supply) particularly if the welding power supply 16 is relatively inductive so that the build up of current is limited to less than say $10^5$ A/seconds.

Figure 6:
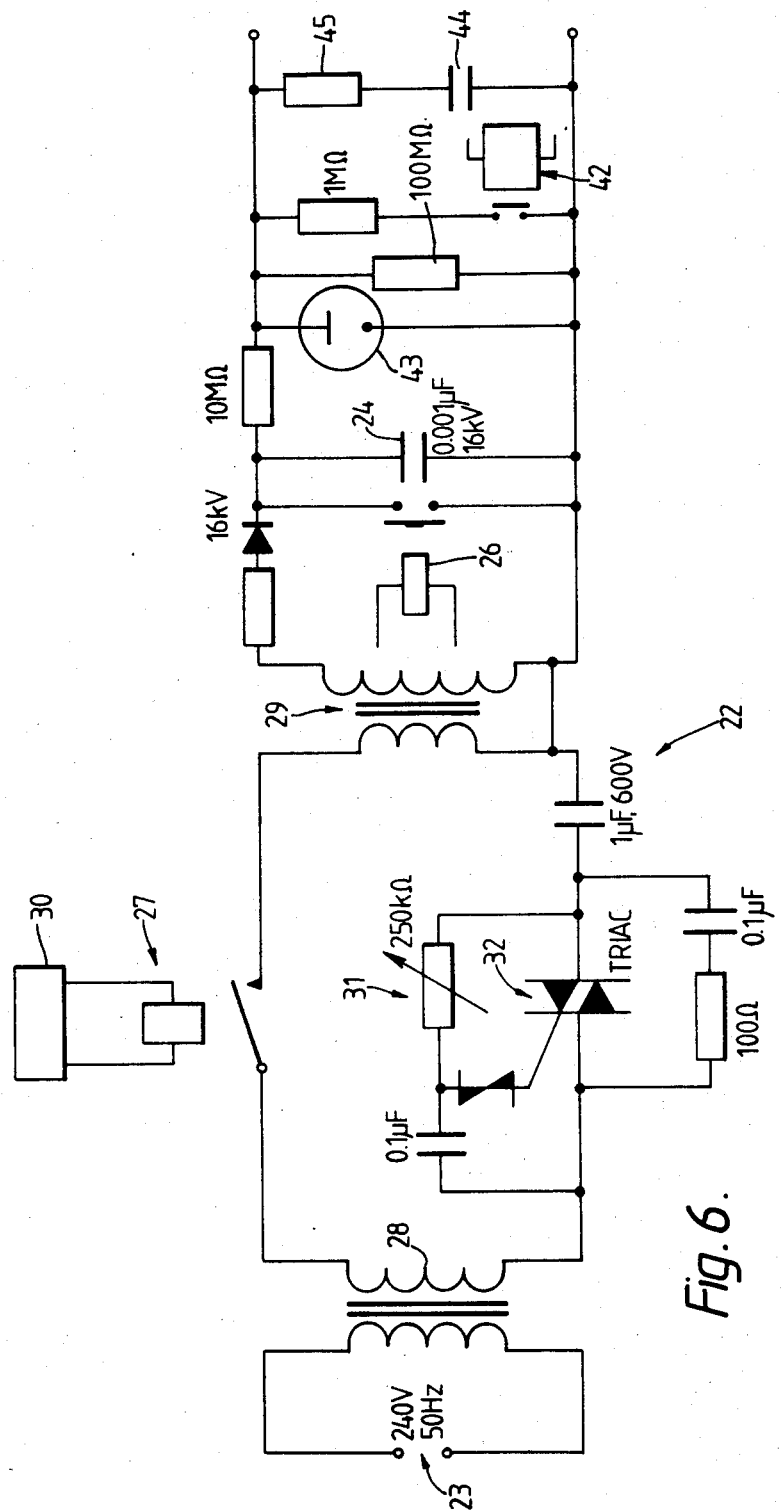
FIG. 6 illustrates a modified medium voltage circuit for arc initiation with minimum and maximum limit values.

FIG. 6 shows a further modification of the auxiliary supply in which the output is divided down via relay contacts 42 to said 1/10 of the output maximum to give for example a minimum voltage level of say 200 V. Thus when relay contacts 26 are opened the voltage builds up to this minimum set level. Thereafter the relay contacts 42 are opened (and the electrode feed initiated) so that the auxiliary voltage continues to build up in a manner similar to that illustrated in FIG. 2. Equally the maximum voltage developed can be limited for example by a corona discharge device 43 so that it does not exceed a set level such as 1 kV, even though the auxiliary voltage circuit has a greater EMF such as 2 kV. This arrangement allows rapid build up of the auxiliary voltage between the set limits.

The energy available for initiating the arc from the auxiliary voltage supply may be enhanced by the capacitor-resistor combination (44, 45) where the resistance ensures that the capacitance discharge is substantially aperiodic. Suitable values are 0.0005 $\mu$F with 0.1M$\Omega$ resistance. The main capacitor 24 can then be beneficially increased to say 0.002 $\mu$F.

Where there is an appreciable leakage path associated with the welding system, as can occur with flux shielded processes such as submerged arc welding and electroslag welding the impedance of the auxiliary supply can be reduced by a factor of say ten, viz resistor 25 of 1M$\Omega$ and leakage resistance 10M$\Omega$ and the resistor controlling the present low value in conjunction with relay contacts 42 reduced to say 0.1M$\Omega$.

The range of auxiliary voltages applied to the welding wire 14 at the time that the electrode is closely approaching the workpiece should not be less than 200 V or more than 2 kV. Preferably the desired voltages should be in the range 400 V to 1 kV. For a particular application such as initating arcs from aluminium electrode wires in argon, the voltage can be preset at a suitable value such as between 600 V and 750 V. In general the higher potential values are suited to the larger diameter wires in order to facilitate breakdown at the appropriately increased initial gap so as to avoid even a brief short circuit following arc initiation. However, as already indicated a momentary short circuit does not lead to the gross spatter associated with short circuit arc initiation as normally practised.

We claim:

1. A method of shielded arc welding using a consumable electrode, said method comprising applying a welding voltage between said electrode and a workpiece; applying an auxiliary substantially constant unipolar voltage between said electrode and said workpiece; and advancing said electrode towards said workpiece, while said auxiliary voltage is applied, whereby said auxiliary voltage initiates an arc between said electrode and said workpiece before said electrode engages said workpiece.

2. A method according to claim 1, wherein said step of advancing said electrode commences shortly after said auxiliary voltage has been applied.

3. A method according to claim 1, wherein said electrode is advanced at a speed in the range 20-100 mm/sec.

4. A method according to claim 1, wherein said auxiliary voltage lies in the range 400-1000 V.

5. A method according to claim 4, wherein said auxiliary voltage lies in the range 600-750 V.

6. A method according to claim 1, wherein said auxiliary voltage is applied in the form of a low frequency surge.

7. A method of shielded arc welding using a consumable electrode, said method comprising applying a welding voltage between said electrode and a workpiece; applying an auxiliary, unipolar voltage between said electrode and said workpiece; and advancing said electrode towards said workpiece while said auxiliary voltage is applied, wherein said magnitude of said auxiliary voltage generally increases from an initial value to a value at which an arc is initiated between said electrode and said workpiece, whereby said auxiliary voltage initiates said arc between said electrode and said workpiece before said electrode engages said workpiece.

8. A method according to claim 7, wherein said rate of increase in said magnitude of said auxiliary voltage lies in the range of 1 kV in 0.1 seconds to 1 kV in 0.01 seconds.

9. A method according to claim 8, wherein said magnitude of said auxiliary voltage increases exponentially.

10. A method according to claim 7, wherein said magnitude of said auxiliary voltage increases exponentially.

11. A method according to claim 7, wherein said step of advancing said electrode commences shortly after said auxiliary voltage has been applied.

12. A method according to claim 7, wherein said electrode is advanced at a speed in the range 20-100 mm/sec.

13. A method according to claim 7, wherein said auxiliary voltage lies in the range 400-1000 V.

14. A method according to claim 13, wherein said auxiliary voltage lies in the range 600-750 V.

15. Shielded arc welding apparatus comprising means for advancing a consumable electrode towards a workpiece; means for applying a welding voltage between said electrode and said workpiece; and auxiliary voltage supply means for applying an auxiliary unipolar voltage between said electrode and said workpiece, said auxiliary voltage supply means being adapted to supply an auxiliary voltage which generally increases from an initial value to a value at which an arc is initiated between said electrode and said workpiece, whereby said auxiliary voltage initiates an arc between said electrode and said workpiece before said electrode engages said workpiece.

* * * * *